Figure 1:
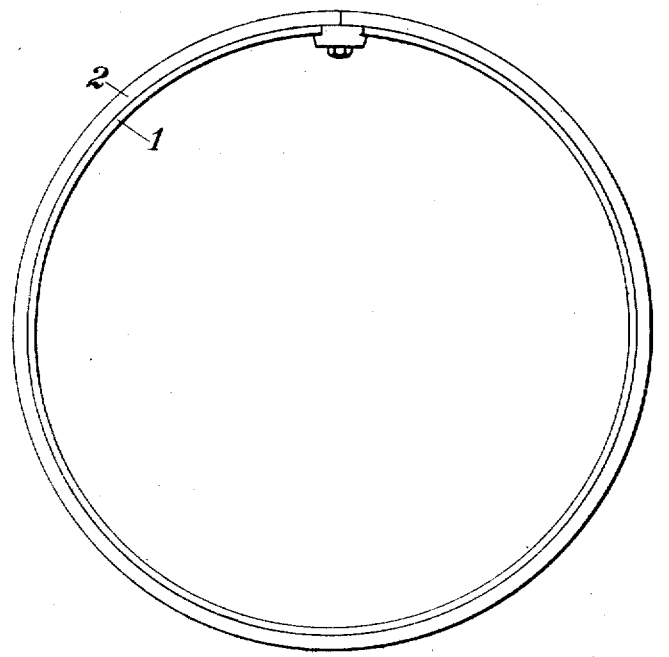

R. S. BRYANT.
SECURING DEVICE FOR TIRE RETAINING FLANGES.
APPLICATION FILED SEPT. 23, 1907.

912,537.

Patented Feb. 16, 1909.

Richard S. Bryant, Inventor

UNITED STATES PATENT OFFICE.

RICHARD S. BRYANT, OF COLUMBUS, OHIO.

SECURING DEVICE FOR TIRE-RETAINING FLANGES.

No. 912,537.  Specification of Letters Patent.  Patented Feb. 16, 1909.

Application filed September 23, 1907. Serial No. 394,149.

*To all whom it may concern:*

Be it known that I, RICHARD S. BRYANT, a citizen of the United States, residing at Columbus, in the county of Franklin and State of Ohio, have invented certain new and useful Improvements in Securing Devices for Tire-Retaining Flanges, of which the following is a specification.

My invention has for its object a device for neatly and securely fastening a tire-retaining flange in position upon the rim body, and is especially applicable to tire-retaining flanges which are removable from the rim body, and are split so that there may be an expansion of the flange in order to seat the same on the rim body or to remove the same therefrom. Preferably the seat for the flange is provided on the rim body and the device for securing the flange in place is preferably constructed to be applied at the ends of the flange after the said flange is positioned.

It is the purpose of my device not only to secure firmly together the ends of the tire-retaining flange after they are properly positioned, but also to assist by means of my device in giving said ends and flange the proper operative position.

My device may be used with tire-retaining flanges of various constructions, and is not therefore appropriated to any particular tire-retaining flange, although in the drawings hereto attached and hereby made a part of this specification, I have shown only one form of tire-retaining flange.

Essentially my device consists in providing lugs adjacent the ends of a tire-retaining flange, said lugs being adapted to extend through the opening or recess in the rim body, and a member is provided for drawing the ends of the tire-retaining flange into closer proximity to each other, and also protecting the lugs from any force which might be directed against them from beneath or from the side; there is also provided by the use of my device a compact and substantial construction which is pleasing to the eye, and further, the operating parts are completely protected from the weather and the dust and dirt incident to automobile usage.

Figure 2:
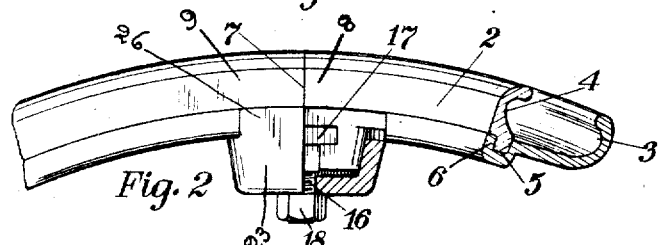
Figure 3:
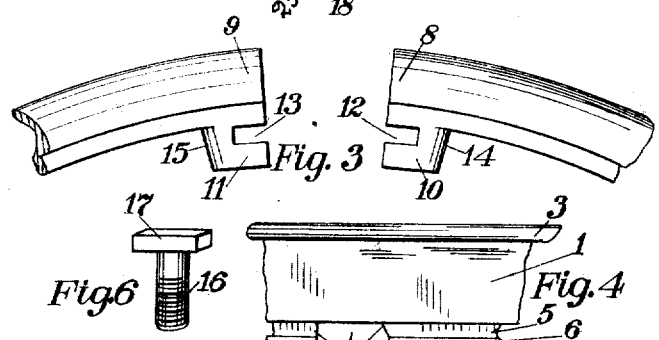
Figures 4, 6:
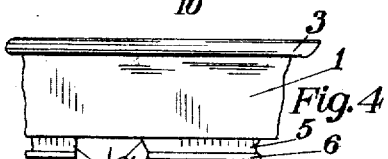
Figure 5:

Referring to the drawings, Figure 1 is a side view of a rim body having a tire-retaining flange in place thereon and containing my improved securing device; Fig. 2 is an enlarged view of a portion of the rim body showing my fastening device partly in section; Fig. 3 is a view of the ends of a tire-retaining flange showing the lugs; Fig. 4 is a top view of the rim body showing the recess made at one side thereof for receiving the lugs on the ends of the tire-retaining flange; Fig. 5 is a perspective of the cap member; Fig. 6 is a view of the bolt used in securing the cap and lugs together.

In the drawings, in which the same numeral indicates the same part throughout, 1 is a rim body having thereon the tire-retaining flange 2, secured in operating position. At 3 is shown the inner tire-retaining flange on the rim body, which is here illustrated integral with the rim body. This integral formation is however not essential, as any construction of flange which performs the function of maintaining the tire in proper position on the rim body may be employed. At 4 the removable flange is shown with the curved or hook shaped upper portion for receiving the tire and maintaining the same in operative position upon the rim body. It is not essential with the use of my fastening device that the removable tire-retaining flange be formed as shown at 2, inasmuch as other forms of tire-retaining flange now in use are adapted for the application thereto of my securing device. At 5 is shown a channel formed along the outer edge of the rim body, said channel being formed in any manner preferred, as will be seen by referring especially to Fig. 2, the tire-retaining flange, when seated in the channel 5, is thereby held against movement either inwardly across the face of the rim body, or outwardly over the edge of the same. The tire-retaining flange may be placed in said channel by stationing one end therein at a desired point, and then exerting lateral pressure on the flange at successive points around the circumference thereof, whereby said flange is readily positioned in the channel entirely around the circumference of the rim body; further, to remove the tire-retaining flange when thus positioned in the channel of the rim body, it is necessary only to lift one end of said flange outwardly away from the rim body, thereby slightly expanding said flange and making it of somewhat larger circumference than the rim body, whereupon it may readily be removed over the outer retaining wall 6 of said channel 5. It is therefore apparent that the positioning and removal of the split tire-retaining flange can readily be accomplished, and this feature of the construction, it is thought, does not require further explanation.

The tire-retaining flange 2 is split at 7 (see Fig. 2), and when positioned for operation upon the rim body, the two ends 8 and 9 are adapted to be brought into close proximity, thereby seating the flange snugly in the channel 5, and so long as it remains in said channel, it is in operative position and the tire is thereby properly maintained on the rim body.

The purpose of my improved securing device is to maintain the tire-retaining flange in its most effective operating position, and to accomplish said purpose, I have shown in the drawings a construction which is a preferable embodiment of my idea. At each end I have provided the tire-retaining flange 2 with lugs 10 and 11, having the extensions 10ª and 11ª similarly formed but oppositely disposed thereon. The lugs are therefore substantially L-shaped and are adapted to be secured in any preferred manner upon the under side of the tire-retaining flange, as shown in Fig. 3. When positioned upon the flange, a recess 12, 13 is created between the lower side of the flange and the lug; it is seen that when the ends of the tire-retaining flange are brought close together, the lugs are brought into proximity with each other. It will be noted that the outer faces of the lugs are slightly inclined as shown at 14 and 15, for purposes hereinafter set forth. A bolt 16, threaded at one end is provided at its opposite end with the head 17, the flange extensions on said head being adapted, when the bolt is positioned, to enter the recesses 12 and 13, as appears clearly in Fig. 2. A nut 18 is provided for said bolt. The stem of the bolt 16, when the latter is operatively positioned, preferably abuts against the oppositely disposed ends of the lugs, and thereby assists in bracing said lugs and stiffens the locking structure.

As shown in Fig. 4, the outer edge of the rim body 1 is cut away or recessed at 19, one edge 20 of this recess being preferably formed at a right angle with the channel 5, but the other edge being formed on an incline, or beveled, as shown at 21. Preferably the outer wall 6 of the channel 5 is not beveled at recess 19 but is preferably cut at a right angle with the channel as shown at 22, the cut across the channel portion being beveled.

In positioning the tire-retaining flange, preferably the end 9 with the lug 11 depending therefrom, is positioned in the channel 5 with the lug 11 extending down through the opening or recess 19, the face 15 of said lug engaging against the side 20 of the recess 19. The end 9 is held in this position preferably by applying one hand of the operator thereto, and with his other hand preferably the operator exerts an inward pressure upon the flange at successive points along the circumference thereof, whereby the said flange is caused to expand sufficiently to pass over the wall 6 into the channel 5. This inward moving of the flange to position the same in the channel is continued around the circumference of the rim body to a point adjacent the recess 19 therein; at this point in the positioning of the flange the end 8 thereof lies across the wall 6 and the lug 10 occupies a position outside of the rim body adjacent the edge 22 of the recess 19. Inward pressure exerted upon the end 8 of the flange forces the face 14 of the lug 10 into engagement with the edge 22 across the face thereof and onwardly along the bevel edge 21 until the flange is seated in the channel 5 and the lug 10 is snugly positioned in the recess 19 against the edge 21 thereof. The flange is now seated in the channel 5 entirely around the circumference thereof, the ends 8 and 9 are in proximity to each other, and the lugs 10 and 11 are positioned in the recess 19 and normally engage respectively with the opposite edges of said recess. The parts being in this position, the flange head 17 of the bolt 16 is inserted in the recesses 12 and 13, as appears in Fig. 2, the stem portion of the bolt extending downwardly therefrom between the ends of the lugs 10 and 11.

The cap member 23 (see Fig. 5) is then applied to the lugs from beneath in such manner that the threaded end of the bolt 16 is received into the opening 24 to project therefrom when the cap is completely positioned. When the cap 23 is fitted over the lugs the upwardly extending lip 26 thereon is positioned on the outside, while the upper edge 25 is positioned beneath the rim body. The nut 18 is placed on the bolt 16, and as it is turned inwardly thereon the cap 23 is forced into a snug embrace of the lugs, the upper edge 25 is forced into engagement with the lower face of the rim body, and the lip 26 is moved into the recess 19 between the opposite edges 20 and 22 thereof, where said lip forms practically a continuation of the wall 6 and lies in contact with the flange 2, as clearly appears in Fig. 2.

The inner faces of the ends of the cap 23 are inclined or flared, and as they take over the faces 14 and 15 of the lugs and are forced thereover, the said cap is caused to exercise a wedge like action on the lugs, thereby drawing the same closer together.

The ends of the flange are thereby drawn into closer proximity and the bolt is drawn downwardly by turning the nut thereon, whereby the ends of the flange are also drawn downwardly, thereby seating the flange snugly in the channel 5 around the circumference thereof.

The cap member 23 is adapted completely to inclose and embrace the lugs, and thereby protect the same against an inadvertent blow thereon, but also against dust and the weather. Further, as shown, the bolt exercises a gripping or binding effect upon the ends of the tire-retaining flange, and this effect is increased materially by the shape of the cap member, so that the nut may be turned upon said bolt with as much force as desired, and there will be no likelihood of breaking or injuring any of the parts. It is seen that an inadvertent blow directed against the cap member when the latter is in position will be easily sustained thereby; it is further noted that the construction embodies few parts, is simply constructed, and when the parts are assembled the depending lugs are protected and braced securely from all sides; and the parts are not only easily assembled but are also readily disassembled, and will not easily be put out of order in use. As regards simplicity, effectiveness, and durability, my device has superior advantages.

What I claim is:

1. A securing device for a split tire-retaining flange comprising lugs depending from said flange adjacent the ends thereof, extensions formed on said lugs, a cap member having an opening therethrough adapted to inclose and embrace said lugs, a bolt having its head adapted to engage said extensions and its stem adapted to project outwardly through said opening in said cap, and a nut adapted to be turned upon said bolt to force said cap and lugs into snug engagement.

2. A securing device for a split tire-retaining flange comprising bevel-faced lugs depending from said flange adjacent the ends thereof, extensions formed on said lugs, a flaring member adapted to embrace said lugs, and means engaging said extensions for forcing said member into snug engagement with said lugs and for maintaining said engagement, whereby said flange is held in operative position.

In testimony whereof I affix my signature in the presence of two witnesses.

RICHARD S. BRYANT.

Witnesses:
 GEO. W. RIGHTMIRE,
 A. RAGER.